United States Patent [19]

Cutler et al.

[11] 4,441,064
[45] Apr. 3, 1984

[54] TWELVE-PULSE OPERATION OF A CONTROLLED CURRENT INVERTER MOTOR DRIVE

[75] Inventors: John H. Cutler, Roanoke; Loren H. Walker, Salem, both of Va.

[73] Assignee: General Electric Company, Salem, Va.

[21] Appl. No.: 332,180

[22] Filed: Dec. 18, 1981

[51] Int. Cl.³ .............................................. H02P 5/40
[52] U.S. Cl. .................................... 318/798; 318/805; 363/72
[58] Field of Search ............... 318/798, 805, 803, 806, 318/807–811; 363/71, 72, 34, 41, 43

[56] References Cited

U.S. PATENT DOCUMENTS

| | | | |
|---|---|---|---|
| 3,611,085 | 10/1971 | Rosenberry | 318/225 R |
| 3,864,620 | 2/1975 | Abbondanti | 363/71 |
| 4,088,934 | 5/1978 | D'Atre et al. | 318/227 |
| 4,230,979 | 10/1981 | Espelage et al. | 318/721 |
| 4,258,416 | 3/1981 | Walker et al. | 363/137 |
| 4,281,276 | 7/1981 | Cutler et al. | 318/803 |
| 4,292,531 | 9/1981 | Williamson | 318/798 |
| 4,349,772 | 9/1982 | Weiss | 318/803 |

*Primary Examiner*—David Smith, Jr.
*Attorney, Agent, or Firm*—Arnold E. Renner

[57] ABSTRACT

A twelve-pulse control current inverter system having two six-pulse powered channels connected to a source of variable dc current is selectively operable to control either a three-phase motor or a double three-phase motor. Signals representing the phase currents of each of the two channels are combined with direct and quadrature motor flux signals, the latter signals being shifted in phase in the case of the double three-phase motor, to produce torque signals representing the motor torque produced by each of the two powered channels. These two torque signals are then combined to provide a total torque signal which, in turn, is utilized in the development of an angle signal for the control of the two current inverters.

11 Claims, 8 Drawing Figures

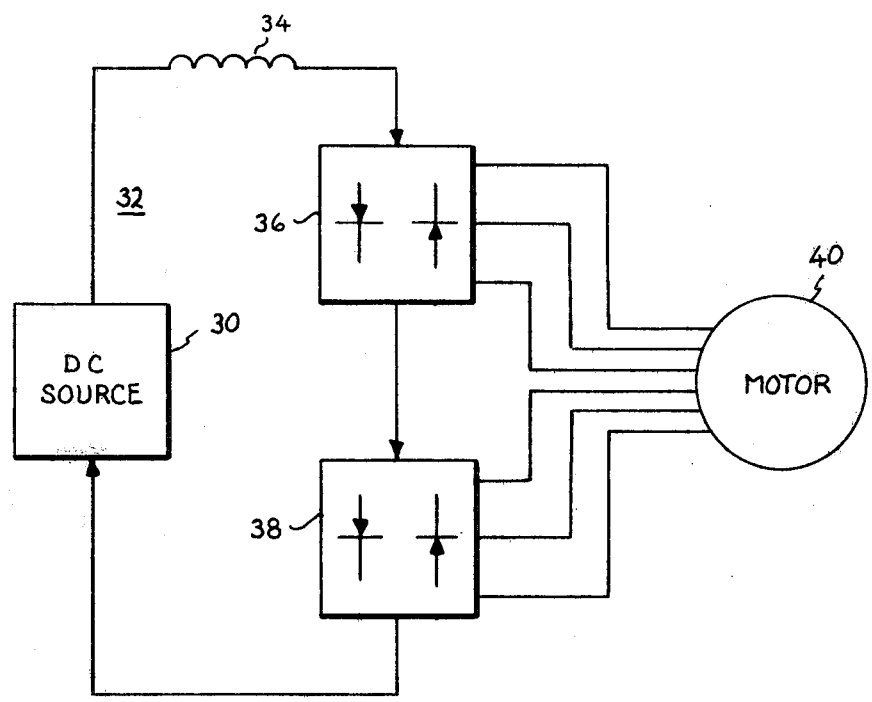
FIG.3
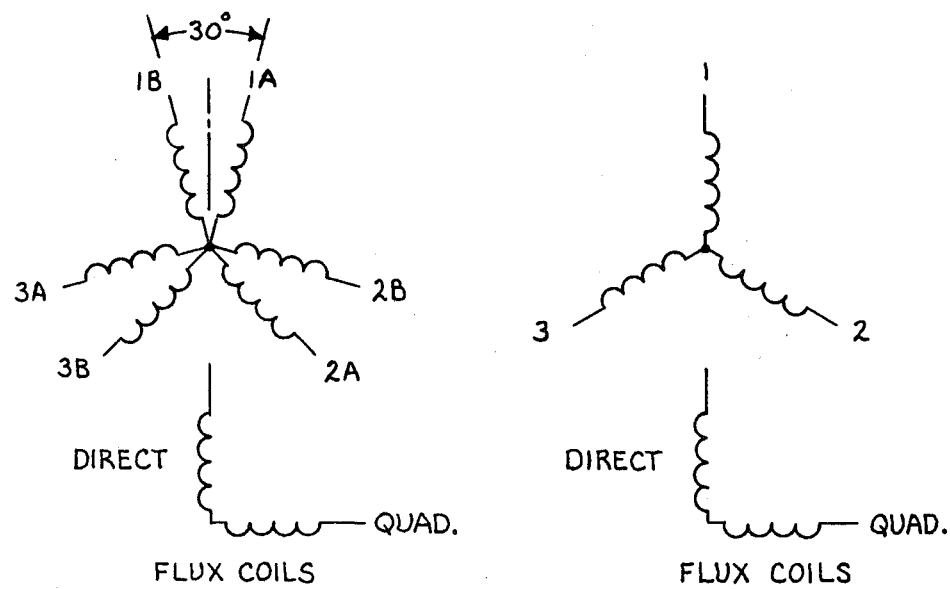
FIG.5      FIG.4

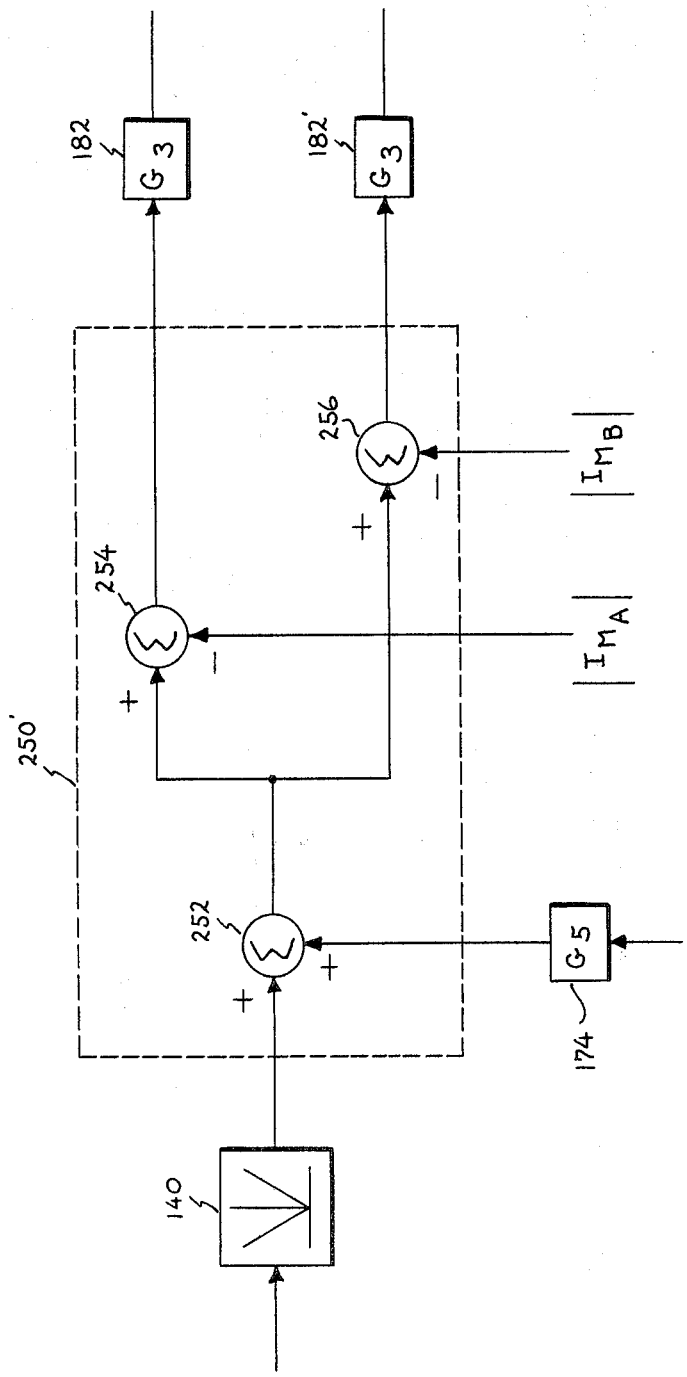

TWELVE-PULSE OPERATION OF A CONTROLLED CURRENT INVERTER MOTOR DRIVE

BACKGROUND OF THE INVENTION

The present invention relates generally to motor drive systems and more particularly to motor drive systems using two what are commonly referred to as six-pulse inverters to provide twelve-pulse operation for an alternating current (ac) motor.

The advantages of employing a twelve-pulse drive, as opposed to the more common six-pulse drive, for the operation of a large ac motor are generally well known. Such twelve-pulse systems normally operate with less harmonics which are reflected back on to the power supply lines to affect other connections to those lines. In addition, insofar as motor operations are concerned, the motor torque pulsations are normally less severe in a twelve-pulse system since these pulsations are of twice the frequency of those of a six-pulse system and their amplitude on a percentage basis is approximately one-half that of the six-pulse system.

Perhaps the most important reason for the use of a twelve-pulse system, however, is that by using, what is here termed a double three-phase motor, higher operating speeds can be obtained. Such double three-phase motors have been known in the art for a number of years and include two sets of stator windings which are phase displaced from each other by some fixed amount, normally thirty electrical degrees. A teaching of such a motor can be found in U.S. Pat. No. 3,611,085, "Preventing Torque Pulsation in Inverter-Fed Polyphase" by George L. Rosenberry, Jr., issued Oct. 5, 1971 and assigned to the assignee of the present invention. This patent, which is hereby specifically incorporated by reference hereinto, shows two voltage source six-pulse inverters supplying what is here being called a double three-phase motor. Although the showing in this patent is that of two delta windings phase displaced, it is apparent that wye winding configurations could be employed with equal facility.

In supplement to the above advantages of twelve-pulse motor operation as such, it is sometimes desirable to utilize the same control for the seqential operation of both three-phase and double three-phase motors. An example of such usage is in dragline operation where double three-phase motor is used for hoisting operations but a standard three-phase motor is employed for the propel function in order to hold to a minimum the number of power slip rings required in supplying the propel motor. Since the hoist and propel functions are not simultaneously employed, the desirability of having a single control for the two types of motors is readily apparent.

SUMMARY OF THE INVENTION

It is, therefore, an object of the present invention to provide an improved twelve-pulse motor drive.

It is another object to provide a twelve-pulse motor drive which is selectively operable with either a three-phase or a double three-phase electric motor.

It is a further object to provide a twelve-pulse motor drive system employing two six-pulse power channels.

It is a still further object to provide a twelve-pulse motor drive system employing two six-pulse power channels in which control is developed as a function of the motor torques attributable to each of the individual channels.

The foregoing and other objects are satisfied in accordance with the present invention through the provision of a six-pulse controlled current inverter system for supplying an ac motor load with ac current of variable magnitude and frequency from dual power channels. The two ac channels are supplied from a variable direct current (dc) source and are each connected to the motor. Included are means to develop both direct and quadrature flux signals proportional to the direct and quadrature components of the flux that is developed in the motor gap between the stator and the rotor. Additionally, means are included to develop phase current signals representing, respectively, the current in each phase furnished to the motor within each of the channels. Utilizing the flux and phase current signals, first and second torque signals are developed which represent the torque developed by the motor from each of the two ac power channels. These two torque signals are then summed and this resultant is used to develop an angle signal representative of the instantaneous angle between the gap flux and the motor current. This angle signal is in turn used to generate a frequency error signal which operates to control the frequency of operation of the two polyphase ac sources supplying the motor.

BRIEF DESCRIPTION OF THE DRAWINGS

While the present invention is particularly defined in the claims annexed to and forming a part of this specification, a better understanding can be had from the following description taken into conjunction with the accompanying drawings in which:

FIG. 3 is a schematic block diagram showing two six-pulse power channels connected in series circuit with a single dc power source to supply a double three-phase motor in a twelve-pulse operational mode;

FIG. 4 is a schematic illustration showing the relationship between the motor field windings and the flux coils in a three-phase motor;

FIG. 5 is an schematic illustration showing the relationship between the motor field windings and the flux coils in a double three-phase motor;

DETAILED DESCRIPTION

Figure 1:
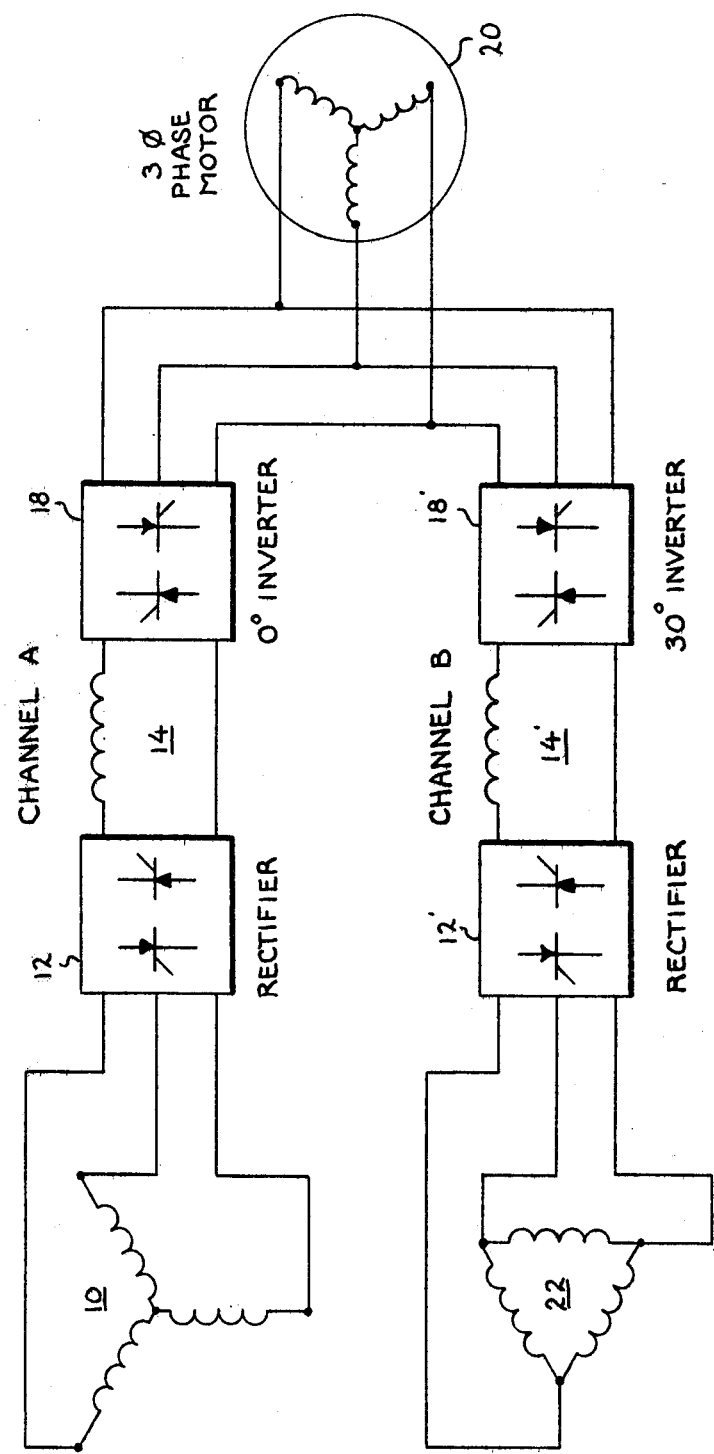
FIG. 1 is a schematic block diagram showing a three-phase motor being supplied in a twelve-pulse mode from two six-pulse power channels.

Referring now to FIG. 1 there is shown a typical twelve-pulse system employing two power channels for supplying a three-phase motor in the twelve-pulse mode. As illustrated, in the upper or A channel a first transformer secondary 10 (the primary not being shown) is connected in a wye configuration and serves to supply ac power to a rectifier 12. Rectifier 12 may be of any suitable type but is most commonly a six-legged solid state bridge comprised of semiconductors such as thyristors. The output of rectifier 12 is supplied by way of a dc link circuit 14, including a suitable smoothing inductor 16, to a zero degree inverter 18 as is known in the art. The second or lower channel B is very similar to channel A excepting that it is noted that the transformer secondary 22 is in this case connected in the delta relationship. An additional rectifier 12' and a dc link circuit 14' having an inductor 16' is connected to a 30 degree inverter 18' the output of which is connected in parallel with the output of the upper A channel to supply a three-phase motor 20. This depiction is a standard type connection and the purpose of connecting the transformer secondaries 10 and 22 in the manner indicated is merely to provide phase displacement on the secondaries so as to reduce harmonics on the input. This type of general connection in the overall system shown in FIG. 1 is that which is essentially well known in the art.

Figure 2:
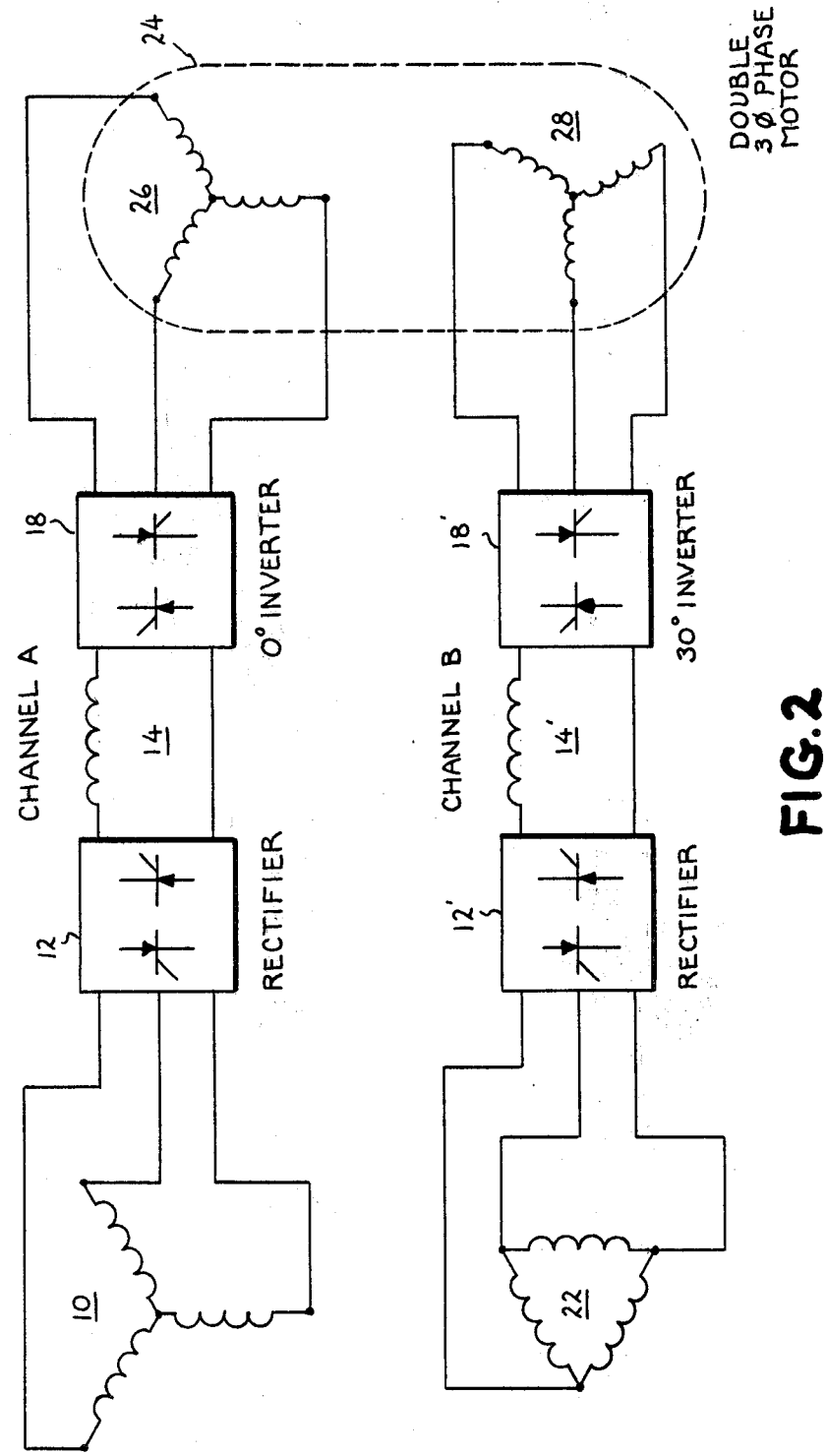
FIG. 2 is a schematic block diagram showing a double three-phase motor being supplied in a twelve-pulse mode from two six-phase power channels.

FIG. 2 shows the identical upper and lower power channels, channel A and channel B, connected to a what is here being termed a double three-phase motor 24. The distinction between FIG. 1 and FIG. 2 exists solely in the connection to the motor and it is seen that the upper power channel, channel A, is connected to a three-phase motor winding 26 connected in a wye configuration and similarly the lower channel, channel B, is connected to a second wye configured motor winding 28 which, within the double three-phase motor 24, is phase displaced with respect to the first winding 26.

FIG. 3 illustrates the manner in which a single dc source 30, which corresponds to the two rectifiers 12 and 12' in FIGS. 1 and 2, is utilized to supply two series connected inverters 36 and 38 by way of a dc circuit 32 including a link inductor 34. The output of the two inverters 36 and 38 are illustrated as being connected to supply a double three-stage motor 40. The illustrations in FIGS. 1, 2 and 3 are those which are basically known in the art and are here included merely to provide the proper background setting for the application of the present invention.

FIG. 4 illustrates the standard relationship existing between the motor windings and the flux coils as found in a three-phase motor. Referencing FIG. 4 the stator windings 1, 2 and 3 are shown in a wye configuration and phased displaced one from the other by 120 electrical degrees. The flux coils labeled respectively "direct" and "quad" represent the direct and quadrature flux coils and it is seen that the direct coil is in phase with one of the windings, in this case winding 1, while the quadrature flux coil is phased displaced from the direct coil by 90 electrical degrees. As is known in the art, the output of these two coils will provide a voltage which, when integrated, will be representative of the rotor to stator air gap flux of the three-phase motor.

In FIG. 5 the relationship of the double three-phase motor with respect to its flux coils is illustrated. It is seen in this case that the respective two sets of wye configured motor windings are displaced from one another by an angle of 30 electrical degrees. For example, winding 1A of one wye configuration is phased displaced from a corresponding winding 1B of the other wye configuration by 30°. The direct and quadrature flux coils are, in this case, not in phase with any of the motor windings. The direct coil is positioned on the bisector of one of the angles between the respective motor windings, for example, that between windings 1A and 1B, such that the coil is phase displaced 15 electrical degrees from each of those windings. The quadrature flux coil, as before, is phased displaced from the direct coil by an angle of 90 electrical degrees. In this situation as was with the case in FIG. 4 the output of these two coils is a voltage which when, integrated, will be representative of motor air gap flux.

Figure 6:
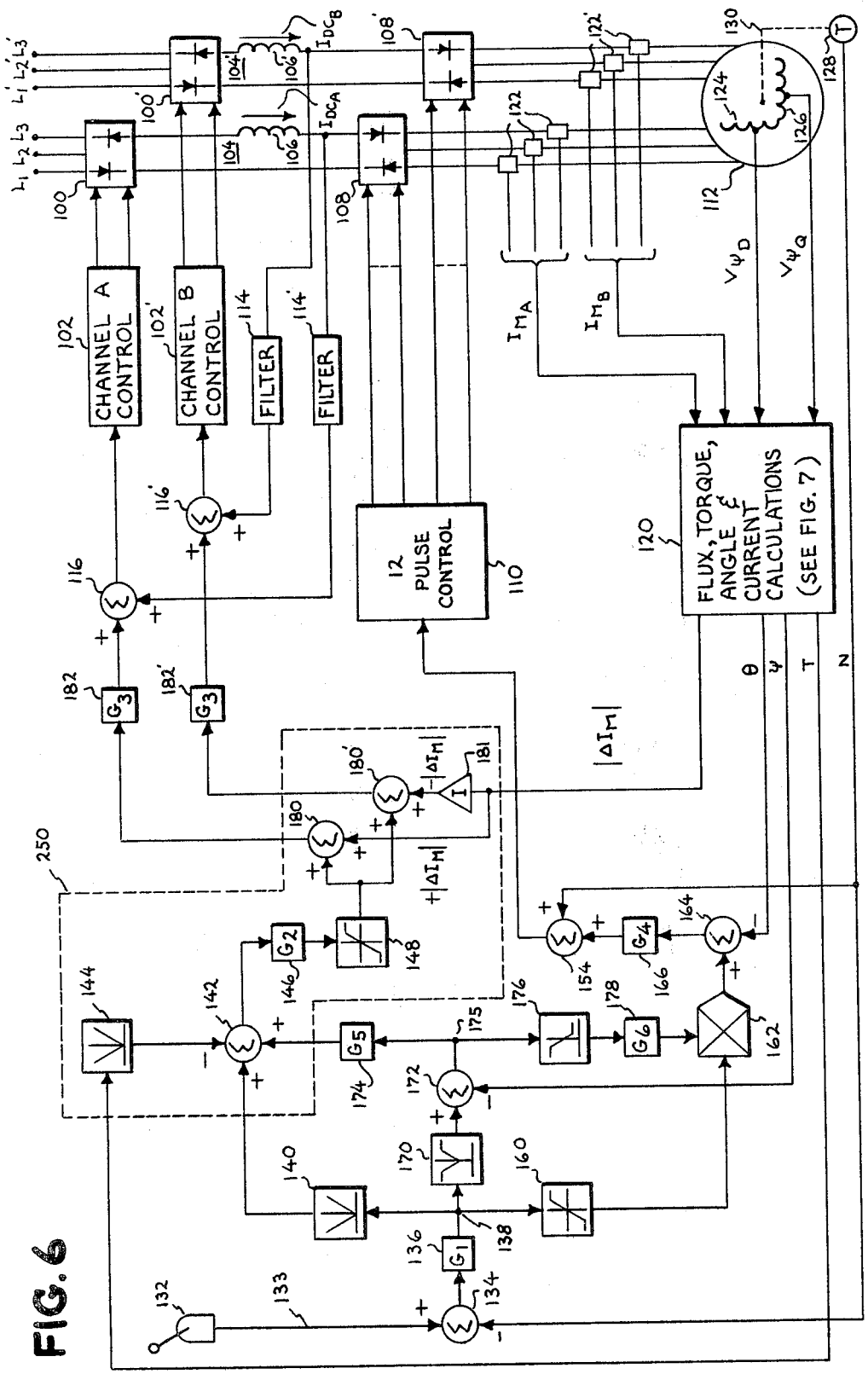
FIG. 6 is a schematic block diagram illustrating the motor drive of the present invention operating in a torque regulating mode.

Reference is now made to FIG. 6 which shows the present invention in its preferred embodiment as applied to controlled motor torque. The system includes a source of variable dc current 100 which is under the control of a suitable control means 102 labeled Channel A Control. A dc current $I_{dcA}$ is supplied from the source 100 by way of a dc link circuit 104 including a filter inductor 106 to a suitable inverter circuit 108 which is under the control of a suitable twelve-pulse control 110. The output of the inverter circuit 108 is supplied to a load shown in FIG. 5 as a motor 112. As will be understood, motor 112 may be either a three-phase motor or a double phase three-phase motor.

The dc source 100 could be any one of a variety of forms such as, for example, a dc chopper whose input terminals are coupled to a non-controlled dc source. In such case a control 102 could be of the time ratio type. More commonly, however, source 100 would be of the form earlier discussed, that is, a multi-leg (e.g. six) thyristor bridge which has its inputs coupled to a three-phase source represented by the terminals $L_1$, $L_2$ and $L_3$. In this situation the control could be of that known type which is synchronized with the line voltage and which, under the control of an input signal, varies the output by varying the firing angles of the bridge thyristors to thereby vary the source output.

A feedback path from the inverter input voltage is provided to the control 102 by way of a filter 114 and a summing junction 116. This is a positive feedback of unity gain. Ignoring for the moment any other inputs to the summing junction 116, this feedback will cause the output voltage of the rectifier 100 to match the voltage reflected by the inverter circuit 108. With no dc voltage across the inductor 106 the inductor will tend to maintain a constant current at any voltage level set by the inverter input voltage. If a second signal is injected into the summing junction 116, i.e., at its other input terminal, this will tend to cause the voltage across the inductor 106 which is proportional to the second signal and a rate of change of the current $I_{dcA}$ in inductor 106 which is proportional to the signal at the second input to the summing junction 116. Thus, the positive feedback signal through filter 114 tends to convert the dc voltage rectifier 100 into a current source responsive to the input at that second input terminal. The second power channel, channel B is shown as being identical to the first and carries the same identification with the prime notation. That is, channel B is supplied from lines $L_1'$, $L_2'$ and $L_3'$ and includes a rectifier circuit 100', a dc link circuit 104' having an inductor 106' feeding an inverter 108' the output of which is supplied to the motor 112. In a similar manner to that described with respect to channel A, source 100' responds to a channel B Control 102' which receives an input from a summing junction 116' which has a positive feedback of the inverter input voltage by way of a filter 114'.

The two inverter circuits 108 and 108' may also take any suitable form but that in most common use today is a six-thyristor bridge of the known type. The operating frequency of the two inverters 108 and 108' is under the control of the twelve-pulse control 110. The exact nature of control 110 is not of prime importance to the instant invention and could be of the known type which includes voltage controlled oscillator feeding a ring counter the output signals of which are used to initiate firing of the thyristors of the two inverter bridges 108 and 108' to thus control the output frequency of those bridges. Preferably, however, control 110 is of the type shown in U.S. Pat. No. 4,258,416 "Inverter Power Conversion System Having Improved Control Scheme" by L. H. Walker et al, issued Mar. 24, 1981 and assigned to assignee of the present invention, which patent is specifically incorporated hereinto by reference. The specific showing of this patent is applied to a six-pulse bridge and, obviously, the expansion of this patent to a twelve-pulse system in order to control both the inverter circuits 108 and 108' would be necessary. This is believed well within the skill of one versed in the art requiring, essentially the doubling of the gating signal registers and the interlacing of these registers with respect to the two inverter circuits 108 and 108'.

In the overall control of the present invention, four signals find primary application. These signals are, respectively, proportional to the gap flux ($\psi$), the electrical torque (T), the angle between the motor flux and the motor current ($\theta$), and the actual motor speed (N). The three signals $\psi$, T and $\theta$ are derived by suitable calculations in response to motor operating parameters and are shown emanating from block 120 which will be discussed in greater detail with respect to FIG. 7. Suffice it to say for the present that the block 120 develops the $\psi$, $\theta$ and T signals as a function of inputs representing motor parameters including the motor currents derived from each of the two power channels. As illustrated in FIG. 6, the motor current from channel A ($I_{MA}$) is the resultant polyphase output of three shunts 122 which are located respectively in each of the three phase lines between the inverter 108 and the motor 112. In a similar manner, motor current from the second or B channel ($I_{MB}$) is shown as being derived from three additional shunts 122' similarly located in the B channel. Two additional inputs to the block 120 are the voltage signals $V_{\psi D}$ and $V_{\psi Q}$ which are shown as derived from a pair of direct and quadrature flux coils 124 and 126, respectively. The speed signal N is derived from some suitable means such as a tachometer 128 which is illustrated, by dashed line 30, as connected to the motor to provide an output signal N which is proportional to motor speed.

The basic control function of the present invention, when the system is operated in the torque control mode, has its origin with the establishment of a torque reference signal. To establish this signal in accordance with the illustration of FIG. 6, there is shown a suitable means such as an operator settable rheostat 132 which provides a signal on line 133 which is proportional to the desired motor speed; i.e., a speed reference signal. The speed signal N from tachometer 128 is combined with the speed reference signal in summing junction 134 such that the output of the junction 134 will be a signal proportional to the difference between the desired and the actual motor speed. This difference signal is supplied to a suitable amplifier 136 having a transfer function appropriate for a speed regulation. Customarily, this transfer function is of an integration type such as that, for example, expressed by the equation: $G_1 = [K(1+St)]/S$, wherein K is a constant, t is a time constant and S is the Laplace transform operator. The output of amplifier 136 at node 138 is a signal which is designated a torque reference signal.

It will be remembered from the previous discussion that the purpose of the direct current sources 100 and 100' is to provide dc currents of varying magnitude in accordance with desired torque. The upper portion of FIG. 6 will, therefore, be discussed first. Since the present invention contemplates motor operation in both the forward and reverse directions and since in either case torque reference signal at node 138 could be of either relative polarity, that signal is first applied to an absolute magnitude circuit 140 the output of which forms one input to a summing junction 142. A second input to junction 142 is the output of a second absolute magnitude circuit 144 which has as its input signal the T signal proportional to the instantaneous torque. Ignoring for the present the third input to summing junction 142, its output as applied to an amplifier 146 is a signal proportional to the difference between the torque reference signal and the actual instantaneous torque. The output of amplifier 146 is applied to a limiting circuit 148 which serves to prevent exceptionally large excursions from occurring in short periods of time. The output of limiter 148 is applied to a pair of summing junctions 180 and 180', the outputs of which are applied respectively to two suitable amplifiers 182 and 182' which form, respectively, the second inputs to the two summing junctions 116 and 116' previously discussed. The second input to the summing injunction 180 is a signal designated $+|\Delta I_M|$ which is derived from the block 120. In a similar manner, the second input to summing injunction 180' is a signal designated $-|\Delta I_M|$ which is the output of an inverter 181 which receives as an input a $|\Delta I_M|$ signal from the block 120. The generation of the $|\Delta I_M|$ signal will be discussed with respect to FIG. 7.

This upper control path just discussed serves to control the output of the two rectifier circuits 100 and 100' such that errors in the torque will be corrected through this upper control path including the two controls 102 and 102'. When more torque is required a positive voltage will be supplied to the controls 102 and 102' to effect more current from the two sources 100 and 100'. Conversely when less torque is required, a negative or less positive signal will be applied to the controls 102 and 102' to thus effect less motor current. The two feedback signals representing the positive and negative values of $|\Delta I_M|$ which are supplied to the two summing junctions 180 and 180' respectively serve to keep the currents in the two power channels supplying the motor balanced.

The next path to be discussed is lower control path shown in FIG. 6 which controls the frequency of inverter operation and hence the air gap power factor. Looking at this lower path, it is seen that the speed signal N from the tachometer 128 forms a positive feedback. That is, tachometer 128 feeds back a dc signal in a positive sense which commands the inverter frequency to remain at zero slip value. As such, the rest of the lower path has only to handle signals proportional to slip frequency. The inverters 108 and 108' are controlled to provide a specified air gap power factor. This power factor may be defined by the angle $\theta$ which is the angle between the motor current and the motor flux. As is known, if this angle is held constant the motor will run at a constant power factor any time that it is loaded.

Beginning again at node 138, the torque reference signal is applied to a suitable limiting circuit or limiter 160 which provides, essentially, an output signal of constant magnitude but varying in polarity in accordance with the polarity of the torque reference signal.

This output of the limiter 160, an angle reference signal proportional to the desired angle of $\theta$, is applied to a multiplier 162 which for the moment may be considered as having a second input of unity such that its output is an exact duplicate of its input. The output of multiplier 162 is applied as one input to a summing junction 164, the other input to which is the angle signal $\theta$ from block 120. These two signals, the angle reference signal from 160 and the angle feedback signal from block 120 form a frequency error signal which is applied by way of a suitable amplifier 166 to a summing junction 154. The output of junction 154 is a frequency command signal which is applied to the twelve-pulse control 110 to thereby control the frequency of the output of the two inverters 108 and 108'. Thus, it is seen that this lower path is essentially a phase lock loop which senses an angle error signal to control the frequency and hence the air gap power factor of the motor.

Since the motor characteristics are often not completely constant nor linear nor accurately known such that the angle $\theta$ can be calculated precisely, a third loop in the form of a vernier is provided. This loop employs the $\psi$ signal from block 120 and functions as a low gain trim to provide modifications to both current control and the frequency control paths to insure that the motor flux is proper value for each torque level. To this end, the torque reference signal from node 138 is supplied to an absolute magnitude circuit 170 which has an offset such that the output of block 170 always has some finite value even through the signal at node 138 goes to zero. The output from block 170, a flux reference signal is furnished as one input to a summing junction 172 the other input of which is the $\psi$ signal having a magnitude proprtional to the instantaneous value of the motor air gap flux. The output of summing junction 172 is termed a flux error signal and appears at node 175 which, in turn, is connected to an amplifier 174 the output of which is applied to the summing junction 142 in a positive sense. This positive addition to the torque control path has effect that if the instantaneous flux is less than that desired, this input will increase the current which is provided as an output from the two sources 100 and 100'. Conversely, if the flux is higher than than desired, a smaller current will be furnished.

The output of junction 172 is also provided to a simple limiter circuit 176 which is provided with an offset so that with zero value of the flux error at junction 175, the output of circuit 176, after being applied through a suitable gain amplifier 178, the output of which serves as an input to the multiplier 162 previously mentioned, will be unity. Other values of the flux error signal will result in multiplication factor greater or less than unity but always greater than zero. The effect of this flux error signal on the angle command is to reduce angle when more reflux is needed.

Those familiar with U.S. Pat. No. 4,230,979 "Controlled Current Inverter and Motor Control System" by P. M. Espelage et al, issued Oct. 28, 1980, which patent is specifically incorporated hereinto by reference, will recognize that the control circuitry as basically described thus far is essentially identical to that shown in that patent. This is particularly true with respect to that portion of the control circuit which precedes the summing junction 154 and the limiter circuit 148. For a fuller understanding of the operation of this portion, reference is made to that patent. The primary difference in that described with respect to FIG. 6 and that found in U.S. Pat. No. 4,230,979 is in the dual power channels the controls for those two channels and, most particularly, with respect to the manner of the generation of the several signals emanating from block 120.

Figure 7:
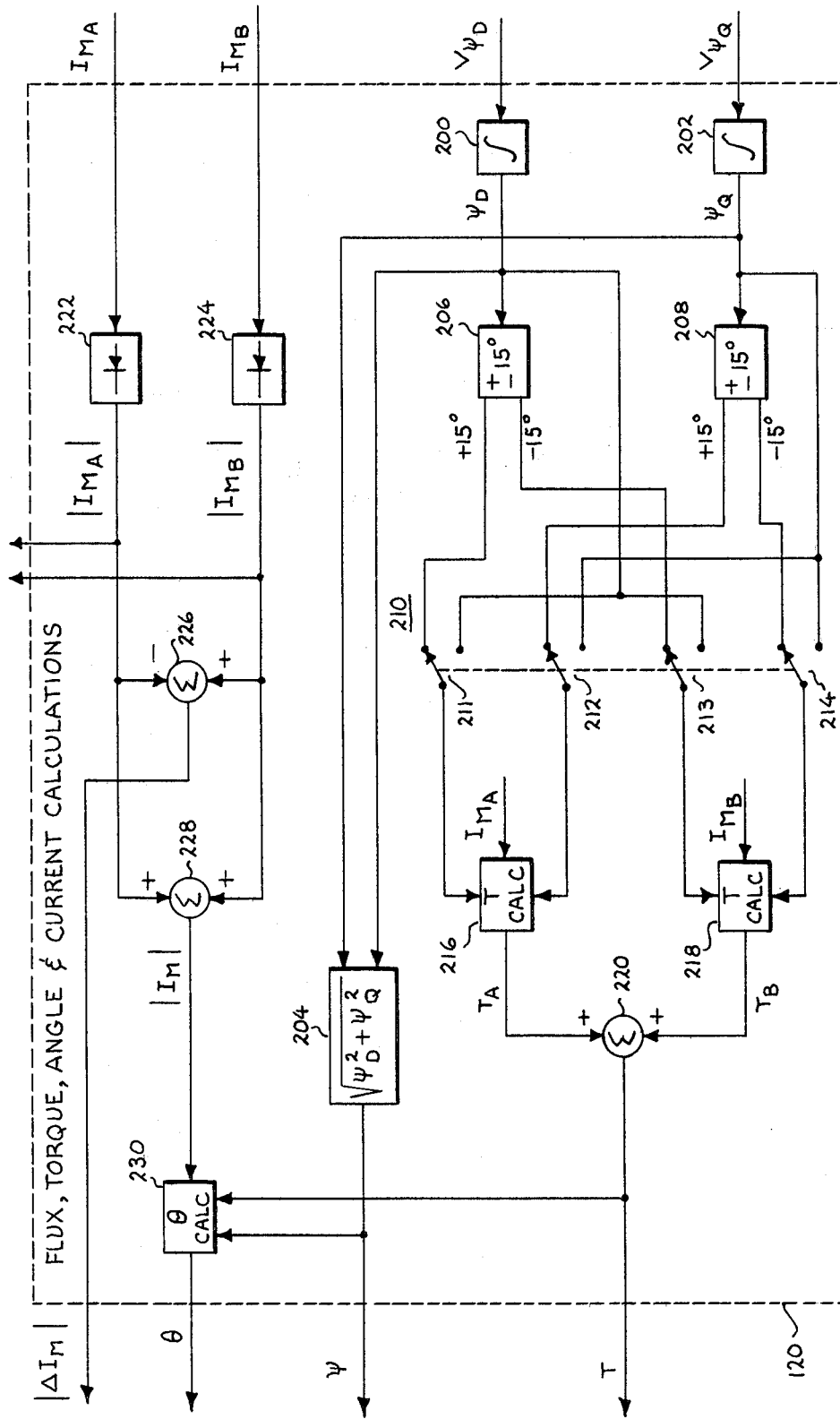
FIG. 7 is a schematic diagram illustrating in greater detail a portion of the showing of FIG. 6 which there illustated only in block form; and, FIG. 8 is a schematic diagram illustrating a possible modification to the showing of FIG. 6 to effect control of motor current rather than motor torque.

For a fuller understanding of the generation of the signals from block 120 in accordance with the present invention, reference is now made to FIG. 7. In FIG. 7, that portion within the dashed line portion represents block 120. As is seen in FIG. 7, the $V_{\psi D}$ and $V_{\psi Q}$ signals are applied, respectively, to integrators 200 and 202 such that the outputs of these two integrators are respectively proportional to the direct and quadrature motor fluxes $\psi_D$ and $\psi_Q$. These two signals are applied to a suitable transfer function block 204 which serves to perform the Pythagorean function of taking the square root of the sum of the squares such that the output of block 204 is the flux signal $\psi$. The output of integrator 200 is applied to a $\pm 15°$ function block 206 while the $\psi_Q$ signal is applied to a similar function block 208. These function blocks are phase shifting networks of the standard type such as those employing operational amplifiers well known in the art and provide outputs representing their input signals but which have been shifted, as indicated, by $+15°$ and $-15°$.

A switching network 210 comprised of four switches 211, 212, 213 and 214 receives the respective phase shifted flux signals from the blocks 206 and 208 as well as the two flux signals $\psi_D$ and $\psi_Q$. In FIG. 7, the switching network 210 is shown as mechanical switches for ease of understanding but it is readily apparent that in practice that these switches would be, in all probability, electrical analog switches. Mechanical switches could be, however, used. The function of the switching network 210 is to selectively provide, for subsequent torque calculations, either the original flux signals $\psi_D$ and $\psi_Q$ or the phase displaced flux signals. The reason for this is that when the motor application is a standard three-phase motor, the original flux signals will be employed. As such, in the illustrated embodiment the switches would be in the down position. When the double three-phase motor is being controlled, the switches would be in the up position as indicated so that the phase shifted flux signals would be utilized. The signals from switches 211 and 212 are applied to a suitable torque calculator 216 along with a signal representative of the motor current supplied from the channel A, that is, the signals $I_{MA}$. In like manner, the outputs of switches 213 and 214 are applied to a torque calculator 218 which also receives the $I_{MB}$ signals from the second power channel supplying the motor. These torque calculators may be of any suitable type but are preferably of those which are described in detail in U.S. Pat. No. 4,088,934 "Means for Stabilizing An A-C Electric Motor Drive System" by J. D. D'Atre et al, issued May 9, 1978, which patent is specifically incorporated hereinto by reference. The output of torque calculator 216 represents the motor torque attributable to power channel A and is designated $T_A$. The output of the torque calculator 218 represents the motor torque from the channel B and is respresented by the signal $T_B$. The $T_A$ and $T_B$ signals are combined in a summing junction 220 in a positive sense such that its output is the T signal earlier described. The $I_{MA}$ and $I_{MB}$ signals are also supplied, respectively, to suitable half or full wave rectifiers 222 and 224 the outputs which, respectively, represent the $|I_{MA}|$ and the $|I_{MB}|$ signals. These two latter signals are combined in opposite senses in a summing junction 226 such that the output signal is the $|\Delta I_M|$ signal previously described. The $|I_{MA}|$ and $|I_{MB}|$ signals are also combined in a positive sense in a summing junction 228 to provide a signal $|I_M|$ representing the absolute magnitude of the total motor current. The $|I_M|$ signal is, in turn, applied to a $\theta$ calculation block 230 which also receives the $\psi$ and T signals from block 204 and summing junction 220 respectively. The calculation of the angle $\theta$ represented by block 230 may be achieved in any appropriate manner but is, preferably, achieved in accordance with that described in the aforementioned U.S. Pat. No. 4,088,934. Thus, it is seen that the four signals $|\Delta I_M|, \theta, \psi,$ and T are generated in accordance with the type motor used through the simple expediency of the phase shifting of flux signals and the switching arrangement described. FIG. 8 shows one possible modification of the present invention where it is desired to regulate the motor current instead of the motor torque. Referencing once again FIG. 6, there is a dashed line block 250 in internal components of which were earlier described. In the case where it is desired to regulate motor current block 250 of FIG. 6 is replaced by that within the dashed line block 250' of FIG. 8. In FIG. 8 the absolute magnitude of circuit 140, the amplifier 174 and the two amplifiers 182 and 182' of FIG. 6 have been included as points of reference. In this scheme where current is regulated, the output of the absolute magnitude circuit 140 is applied to a summing junction 252 which receives as its only other input the output from the vernier control, that is the output of the amplifier 174. The sum of these two signals is applied respectively to a pair of summing junctions 254 and 256. The second input to junction 254 is the $|I_{MA}|$ signal which is derived from rectifier 222 while the second input to the summing junction 256 is the $|I_{MB}|$ signal from rectifier 224. Since in this embodiment there is no torque feedback to the summing junction 252, the output of the absolute magnitude circuit 140 represents a current reference signal which, when modified by the current feedback signals applied to junctions 254 and 256, serves to maintain current balance within the two power channels earlier described. This current feedback is similar to that shown in U.S. Pat. No. 4,281,276, "Dual Motor AC Motor Drive System" by John H. Cutler et al, issued July 28, 1981.

Thus, it is seen that there has been shown and described a control system for controlling either a three-phase or a dual three-phase motor in a twelve-pulse mode in either the torque regulation or the current regulation for modes of operation.

While there has been shown and described what are at present considered to be the preferred embodiments of the present invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:

1. An ac motor drive for use with an ac motor having a stator and a rotor spaced from said stator by a gap across which gap flux is produced in response to electrical currents supplied to said motor comprising;
   (a) a source of variable dc current;
   (b) first and second sources of variable frequency polyphase ac current connected to said source of dc current for furnishing a motor current to the motor;
   (c) means to develop direct and quadrature flux signals proportional to direct and quadrature components of motor gap flux;
   (d) means to develop phase current signals representing, respectively, the current in each phase of the current furnished to the motor;
   (e) means responsive to said phase current signals and said flux signals to develop first and second torque signals representing the torque developed by the motor from each of said sources of ac current;
   (f) means to sum said first and second torque signals to provide a total torque signal;
   (g) means responsive to said total torque signal to develop a single angle signal representative of the instantaneous angle between the gap flux and motor current; and,
   (h) means responsive to said angle signal to generate a frequency error signal operative to control the frequency of operation of said first and second sources of variable frequency, polyphase electrical power.

2. Invention in accordance with claim 1 wherein said source of variable dc current and said first and second sources of variable frequency polyphase ac current are connected in series circuit.

3. An ac motor drive for use with an ac motor having a stator and a rotor spaced from said stator by a gap across which gap flux is produced in response to electrical current supplied to said motor comprising:
   (a) first and second electrical power channels each including a source of variable dc current, a source of variable frequency polyphase ac current for furnishing a motor current to the motor and a dc link circuit for supplying current from said source of dc current to said source of ac current;
   (b) means to develop phase current signals representing, respectively, the current in each phase of the current furnished to the motor;
   (c) means to develop direct and quadrature flux signals proportional to direct and quadrature components of the motor gap flux;
   (d) means responsive to said phase current signals and said flux signals to develop first and second torque signals representing the torque developed by the motor from each of said power channels;
   (e) means to sum said first and second torque signals to provide a total torque signal;
   (f) means responsive to said total torque signal to develop a single angle signal representative of the instantaneous angle between the gap flux and motor current; and,
   (g) means responsive to said angle signal to generate a frequency error signal operative to control the frequency of operation of said first and second sources of variable frequency, polyphase ac current.

4. Invention in accordance with claim 3 further including:
   (a) first and second means to control, respectively, said first and second sources of variable dc current in response to respective current control signals;
   (b) means to provide a torque reference signal proportional to the desired motor torque;
   (c) means to provide a current error signal as a function of the torque reference signal and said total torque signal;

(d) means to provide said respective current control signals as a function of the current error signal; and, (e) means for modifying said respective current control signals to achieve current balance between said first and second power channels and torque smoothing of said motor operation comprising, (1) means to derive a delta signal representing the difference between the motor currents of said first and second power channels, and (2) means to combine said delta signal with a first of said control signals in a positive sense and with the second current control signals in a negative sense.

5. Invention in accordance with claim 3 further including:

(a) first and second means to control, respectively, said first and second sources of variable dc current in response to respective control signals;

(b) means to provide said respective current control signals as a function of an input signal denoting a desired level of motor current;

(c) means to develop first and second feedback signals proportional, respectively, to the motor current from each of said sources of ac current; and, (d) means to combine the respective first and second feedback signals with the corresponding current signal for each of said channels to thereby provide for control of the current furnished by said sources of variable dc current.

6. An ac motor drive in accordance with any of claims 1, 2, 3, 4 or 5 for use with a double three-phase motor having two sets of three-phase windings phase displaced by a prescribed amount further including;

(a) means for shifting the phase of said direct and quadrature flux signals by predetermined amounts prior to use in developing said first and second torque signals.

7. Invention in accordance with claim 6 wherein the total displacement of each of said flux signals is equal to the phase displacement between the two sets of motor windings.

8. The invention in accordance with claim 6 wherein each of said flux signals is displaced by positive and negative 15 electrical degrees.

9. An ac motor drive in accordance with any of claims 1, 3, 4 or 5 for use, selectively, with a three-phase motor or a double three-phase motor having two sets of three-phase windings phase displaced by a prescribed amount further including:

(a) means for shifting the phase of said direct and quadrature flux signals by predetermined amounts to provide shifted direct and quadrature flux signals; and, (b) switching means selectively operable to provide for use, by said torque calculating means, (1) said direct and quadrature flux signals for use with a three-phase motor, and, (2) said shifted direct and quadrature flux signals for use with a double three-phase motor.

10. The invention in accordance with claim 9 wherein the total phase shifting of said flux signals is equal to the phase displacement between the sets of motor windings of said double three-phase motor.

11. The invention in accordance with claim 9 wherein said flux signals are phase shifted, respectively, by positive and negative 15 electrical degrees.

* * * * *